US006944643B1

(12) United States Patent
Ahmad et al.

(10) Patent No.: US 6,944,643 B1
(45) Date of Patent: *Sep. 13, 2005

(54) METHOD FOR DEPLOYMENT MODIFICATION OF TRANSACTIONAL BEHAVIOR IN CORBA OTS

(75) Inventors: Andrew Ahmad, Bedford, TX (US); Jason Xue, Irving, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 382 days.

This patent is subject to a terminal disclaimer.

(21) Appl. No.: 09/772,548

(22) Filed: Jan. 30, 2001

(51) Int. Cl.[7] .............................................. G06F 15/16
(52) U.S. Cl. ....................... 709/203; 709/204; 709/205; 707/103; 707/10
(58) Field of Search .................... 707/1–246; 709/203, 709/204, 310–316

(56) References Cited

U.S. PATENT DOCUMENTS

| | | | | |
|---|---|---|---|---|
| 6,070,197 A | * | 5/2000 | Cobb et al. | 719/315 |
| 6,567,818 B1 | * | 5/2003 | Frey et al. | 707/103 R |
| 6,633,923 B1 | | 10/2003 | Kukura et al. | 709/316 |
| 6,671,686 B2 | * | 12/2003 | Pardon et al. | 707/8 |
| 6,708,223 B1 | | 3/2004 | Wang et al. | 709/315 |

OTHER PUBLICATIONS

Component Technologies for the Middle Tier: CCM, EJB, COM+, OOPSLA 200, by Michael Stal.*
Priya Narasimhan, et al., *Using Interceptors to Enhance COBRA*, Jul., 1999, pp. 62-68, University of California, Santa Barbara.

* cited by examiner

Primary Examiner—John Follansbee
Assistant Examiner—Mohammad Siddiqi

(57) ABSTRACT

The present invention extends the programming model of OTS by providing a unique model that offers both flexibility and ease of use. This model separates the transactional behavior of CORBA method from the IDL interface. The transactional behavior of the CORBA method is specified in a deployment descriptor file. Each method is associated with a transactional policy. The server reads the policies of the methods during deployment time and makes decisions of making the method transactional based on the policy. Changing the transactional policy of a method is as easy as modifying the deployment descriptor and redeploying the server. If either of the two usage models that OTS offers is used, making a method transactional means that the IDL interface has to change, causing all the software components in the system to re-compile. With the present invention, such a change can be accomplished without need for such recompilation.

11 Claims, 4 Drawing Sheets

METHOD FOR DEPLOYMENT MODIFICATION OF TRANSACTIONAL BEHAVIOR IN CORBA OTS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention is in the field of distributed object computing systems and more specifically transaction management in such systems.

In order for diverse applications to communicate with one another and share data, standards (uniform conventions for data storage and communication) had to be established. Standards allow businesses to use applications in a heterogeneous operating environment, which run on top of infrastructure from multiple vendors. Standards also promote portability, making it possible for an organization to migrate from one system to another. Indirectly, standards also make it easier and cheaper to implement a complex system, because they impose a proven framework for solving problems by breaking them into discrete parts.

In 1989, a diverse group of vendors and users who believed in the benefits of object-oriented development formed an industry coalition. This group's goal was the development of a consensual standard for work with objects. This coalition, the Object Management Group (OMG), is now the world's largest software consortium, with more than 800 corporate members. CORBA, the Common Object Request Broker Architecture, is the OMG's distributed, object-oriented application standard [CORBA2.3.1] which is incorporated herein by reference. The architecture describes how object-oriented programs should communicate with one another in a distributed computing environment.

At the heart of the CORBA specification is the Object Request Broker (ORB). The ORB is the software entity that manages the interactions between objects (called CORBA objects) on the network. For example, if an application wishes to invoke a function on a CORBA object on another computer, it is the ORB that locates the object and guarantees that the function will be correctly invoked on the target object. An ORB might be implemented as a software library, as operating system kernel routines, as an executable program, or as some combination of the three. From the users' point of view, it is irrelevant how the ORB is implemented; all that matters is the functionality that the ORB provides.

The CORBA 2.1 specification provides a detailed list as to the functionality that a CORBA 2.0-compliant ORB must support. In addition to standard Application Programming Interfaces (APIs), the standard requires the support of the Internet Inter-ORB Protocol (IIOP). Support for IIOP is important since it guarantees interoperability among the various vendors' ORB offerings.

On top of the basic CORBA specification, the OMG also specifies various Object Services. The Object Services increase the functionality of the ORB environment and provide a standard mechanism for performing common tasks. Object Services that have been specified by the OMG include naming, persistence, events, lifecycle, transactions and security.

The CORBA specification directly addresses the distributed application development concerns introduced above as follows:

The CORBA specification mandates the location transparency of objects. This means that the developer need only be concerned with which objects to contact and how to invoke function calls, not where those objects are physically located on the network. The location transparency property of the CORBA specification greatly facilitates the development of distributed applications.

Traditional network environments envision many clients communicating with a single server. The resulting applications are often not scale-able, since the clients can easily overwhelm the server. The CORBA architecture provides a model in which an application can be composed of objects located on any number of computers. This is much more flexible and scaleable than the traditional client-server architecture of the past.

The programming language in which objects are implemented is not important. It makes no difference if a front-end client program is written in Java or Smalltalk, while the server application is written in C or C++. The CORBA architecture guarantees that any CORBA client can communicate with any CORBA server. By being able to think and develop at the object interface level, many of the difficult details related to network heterogeneity are abstracted in the CORBA environment.

Data consistency is not addressed by the core CORBA specification, but is left to the Object Transaction Service (OTS). The OTS specification defines interfaces that enable application developers to develop transaction-oriented applications that have guaranteed data consistency. The OTS specification includes interfaces that implement functions such as rollback and commit that are necessary to implement distributed transaction processing.

Although some rudimentary security provisions are included in the core CORBA specification, the main security framework is specified at the Object Service level with the Security Object Service. This specification includes a complete security framework that addresses the various levels of security needed by a distributed application.

When a client wishes to communicate with the CORBA server, it sends that request to an Object Request Broker (ORB), which locates (or creates) the requested object and initiates communication between the two. The ORB frees the client application from having to know whether the objects it requires reside on the same computer or are located on remote computers somewhere on the network. The client application only needs to know the objects' names and understand the details of how to use each object through a call to its interface. The ORB takes care of the details of locating the object, routing the request, and returning the result.

The Object Management Group's Interface Definition Language (IDL) is a language that defines interfaces for object-based systems. The language-independent IDL files define the operations that an object is prepared to perform, the input and output parameters it requires, and any exceptions that may be generated along the way.

IDL files can be thought of as a contract that a CORBA server writes for potential clients of the object. Such clients must use the same interface definition to build and dispatch invocations that the CORBA server uses to receive and respond. The client and the server are then connected via at least three pieces of software: an IDL stub on the client, one or more ORBs, and a corresponding IDL skeleton in the object's implementation.

IDL is responsible for CORBA's language flexibility. It is kind of "middle-ware" that allows a program written in C++ to use objects written in Smalltalk, for example, and vice-versa. IDL can even be used to create object-based servers in languages like C that are not object-oriented. Indeed, with IDL, an entire program running on one computer can be viewed as a single object by a client running on another. A word processor, a spreadsheet or a CAD system can have an interface written in IDL to offer object-based services to clients running on other machines. Thus, IDL and CORBA are ideally suited for object-based interfaces to transaction processing systems.

The Object Transaction Service (OTS) is the Object Management Group's formal specification [OTS97], which is incorporated herein by reference, describing how programs should communicate with transaction processing servers in an object-oriented way. It defines a list of services that can be provided to aid in online transaction processing by defining how atomic transactions can be distributed over multiple objects and multiple ORBs. It is part of the CORBA services.

OTS is designed to work concurrently with both traditional client server-based transactions services and with ORB-based services that follow the new CORBA standards. This makes it easier for an organization to migrate from traditional client-server systems that implement the X/Open-compliant transaction monitors to next-generation object-oriented client-server systems that follow the CORBA specification.

The word transaction has a very broad scope. An ORB-based transaction can include multiple local database transactions controlled through OTS. It can include a single database transaction on a local or remote server. If the transaction is entirely local to the client that initiates it, then the ORB should be bypassed and the transaction is controlled locally. Further, the OTS offers the capability of supporting recoverable nested transactions, in either a homogeneous or heterogeneous environment, that fully support Atomicity, Consistency, Isolation, and Durability (ACID), and two-phase commit protocols.

Specific object-oriented transaction processing systems include TPBroker and similar software. The preferred embodiment of the present invention runs in the presence of Hitachi's TPBroker which is a combination of VisiBroker ORB for C++ and Hitachi's TPBroker Object Transaction Service. Operation of Hitachi's TPBroker is understood to those of skill in the art and the Programmer's Guide for Release 3.1.1 of the VisiBroker for C++ORB and Release 3.1 of Hitachi's OTS are incorporated herein by reference for background information. The present invention could alternatively run in cooperation with alternative ORBs and OTSs which, like TPBroker, implement the Object Management Group's CORBA 2.1 specification for distributed object-based applications and the OMG Object Transaction Services 1.1 specification. Both TPBroker and alternative systems run on a server-based ORB and provide a transaction infrastructure and middleware solution for the distributed object and object component marketplace.

Distributed Transaction Management is an important element in any mission critical business applications. It ensures data Integrity in a highly distributed, cross-platform and cross-language environment. Distributed transaction management for CORBA applications are standardized by the OMG-defined OTS (Object Transaction Service).

To client application programs, OTS offers two Programming Models to manage a transaction: direct or indirect context management.

With indirect context management, an application uses the Current object (OTS defined object) provided by the Transaction Service, to associate the transaction context with the application thread of control.

With direct context management, an application manipulates the Control object and the other objects associated with the transaction.

The two programming models of OTS can be used together with different propagation methods. Propagation is the act of associating a client's transaction context with operations on a target object. OTS provides two methods of propagation. An object may require transactions to be either explicitly or implicitly propagated on its operations.

With implicit propagation, requests are implicitly associated with the client's transaction; they share the client's transaction context. The transaction context is transmitted implicitly to the objects, without direct client intervention. Implicit propagation depends on indirect context management, since it propagates the transaction context associated with the Current object.

With explicit propagation, an application propagates a transaction context by passing objects defined by the Transaction Service as explicit parameters.

An object that supports implicit propagation would not typically expect to receive any Transaction Service object as an explicit parameter. A client may use one or both forms of context management, and may communicate with objects that use either method of transaction propagation. This results in four ways in which client applications may communicate with transactional objects. They are described below.

Direct Context Management: Explicit Propagation

The client application directly accesses the Control object and the other objects which describe the state of the transaction. To propagate the transaction context to an object, the client must include the appropriate Transaction Service object as an explicit parameter of an operation.

Indirect Context Management: Implicit Propagation

The client application uses operations on the Current object to create and control its transactions. When it issues requests on transactional objects, the transaction context associated with the current thread is implicitly propagated to the object.

Indirect Context Management: Explicit Propagation

For an implicit model application to use explicit propagation, it can get access to the Control object using the get control operation on Current object. It can then use a Transaction Service object as an explicit parameter to a transactional object. This is explicit propagation.

Direct Context Management: Implicit Propagation

A client that accesses the Transaction Service objects directly can use the resume operation on Current object to set the implicit transaction context associated with its thread. This allows the client to invoke operations on an object that requires implicit propagation of the transaction context.

The easiest to use is the combination of indirect context management and implicit propagation, because the programmer on both client and the server side need not to write any code to manage and propagate the context. These tasks are completely hidden to the users.

However, the two methods of propagation offered by OTS, namely implicit and explicit propagation, require the tight coupling of the transactional characteristics of the CORBA methods and the IDL interface in a distributed software system.

With the implicit model, in order to make the methods in the user IDL transactional, OTS requires that the IDL interface inherit from the CosTransactions::CosTransactionalObject interface provided by OMG, which makes the transactional behavior of the methods in the user's IDL coupled with the interface.

For example, suppose there is an interface called Account. The supposed interface has one method defined in the interface called update. To invoke this method inside a transaction, the Account interface has to inherit from Cos-Transactions::CosTransactionalObject interface.

The following is the IDL:
  interface Account:CosTransactions::TransactionalObject
  {
    void update (in long 1Balance);
  };

This IDL is then used to generate the client stub and server skeleton which are eventually compiled together with the Account client and Account server.

To change the update method to be non-transactional, the IDL would have to be modified to be:
  interface Account
  {
    void update(in long 1Balance);
  };
and then the client stub and server skeleton re-generated, and the client and the server re-compiled. This impacts the entire system that is using the Account interface.

The explicit model on the other hand, does not require the CosTransactions inheritance, but the "control" object, which is an object that represents the transaction context, must be passed as an argument of the CORBA method of the IDL. For the Account example, the IDL looks like this:
  interface Account
  {
    void update(in long 1Balance, in CosTransactions::Control control);
  };

The Account client has to pass the CosTransactions::Control explicitly as an argument when invoking the update method on the server side.

Although the Account interface does not need to inherit from CosTransactions::TransactionalObject, the control object still is part of the signature of the update method. The server side programmer needs to get the control object and manage the transaction himself. Not only does the explicit propagation not solve the problem of the coupling of the interface and the transactional behavior, (the transactional behavior is coupled not at the interface level like in the case of implicit propagation, but at the method level) it increases the complexity for the programmers.

In a commercial environment, the requirement of a method being transactional or not is highly dynamic; it changes over time. On the other hand, the interface or the IDL of the software components should be relatively stable. By adopting any of the two propagation methods of OTS, any change in the transactional behavior of a CORBA method will result in a change in the interface or IDL. This will result in the re-compilation of the whole system.

The EJB (Enterprise Java Beans) standard from SUN Microsystems is another standard in the enterprise arena. EJB provides distributed transaction service through JTS (Java Transaction Service). The programming model of JTS is more flexible than that of OTS. The component or the beans can specify different transactional policies on the methods of the remote interface through a deployment file. The policies are read by the EJB container during deployment time.

The Enterprise Java Beans standard defines six policies:
  NotSupported
  Required
  Supports
  RequiresNew
  Mandatory
  Never The transactional behavior of the Java method is not tied with the EJB interface, rather, it is controlled by the deployment file. The transactional behavior is determined at deployment time. However, unlike CORBA, which is language and platform independent, EJB is only for Java, and it can not be applied to programs outside the EJB world. Therefore, this programming model is only available for the EJB compliant components.

SUMMARY OF THE INVENTION

The present invention provides a method for setting transactional behavior for a CORBA method. Under the present invention a system remote from a client creates a transaction policy by translating a deployment descriptor file. The client, residing on a system local to the client, calls a CORBA method, residing on a system remote from the client. The call comprises an IIOP message including a method name for the CORBA method called. An interceptor residing on the system remote from the client intercepts the IIOP message. The interceptor then reads the method name from the IIOP message, checks the transaction policy for the system remote from the client with respect to the method name, and either invokes the called CORBA method directly or first completes a control object interpositioning process and then invokes the called CORBA method. The choice is defined by the results of the check of the transaction policy with respect to the method name.

In the preferred embodiment, the transaction policy created on the system remote from the client is created during deployment of the system remote from the client. In an alternative embodiment, the transaction policy created on the system remote from the client is created after receipt of the IIOP message to facilitate run-time comparison of the method name with the deployment descriptor file.

An embodiment of the present invention may also be viewed as a method for changing transactional behavior for a CORBA method resident on a server. The invention includes defining transactional behavior for a CORBA method resident on a server in a transaction policy implemented on the server. The transaction policy is translated from a deployment descriptor file during deployment of the server. Invocations of the CORBA method from client objects result in a defined transactional behavior based on the transaction policy. The transactional behavior of the CORBA method on the server is changed by modifying the deployment descriptor file and redeploying the server. This results in implementation of a modified transaction policy translated from the modified deployment descriptor file. Following redeployment, identical invocations from identical client objects result in a different defined transactional behavior for the CORBA method on the server based on the modified transaction policy.

The deployment descriptor file for the present invention may take on several forms and be handled in several ways without departing from the spirit of the invention. These include but are not limited to the following. In one alternative to this embodiment, the deployment descriptor file and the transaction policy translated from the deployment descriptor file define transactional behavior for more than one CORBA method resident on the server. In the most preferred embodiment, the deployment descriptor file and the transaction policy translated from the deployment descriptor file define transactional behavior for all CORBA methods resident on the server. In the most preferred embodiment the deployment descriptor file is a text file and the transaction policy is a table translated from the text file. In the most preferred embodiment, the deployment descriptor file is stored on the server, but in an alternative embodiment the deployment descriptor file is stored in a location remote from the server. Where the deployment descriptor file is stored in a location remote from the server, the deployment descriptor file may be translated by a plurality of servers to create the transaction policies for the plurality of servers.

The most preferred embodiment of the present invention also provides a method for propagating transactional context for a CORBA transaction. In this method, a client calls a CORBA method, wherein the client resides on a system local to the client, wherein the CORBA method resides on a system remote from the client, and wherein the call comprises an IIOP message having a service context. An interceptor residing on the system local to the client intercepts the IIOP message, inserts an object representing the transaction context on the service context of the IIOP message, and returns the IIOP message to its original path. An interceptor residing on the system remote from the client intercepts the IIOP message and extracts the object representing the transaction context from the service context of the IIOP message. In its most preferred embodiment, the interceptor residing on the system remote from the client completes a control object interpositioning process between the object representing the transaction context and an OTS spanning both the system local to the client and the system remote from the client and then invokes the called CORBA method.

DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention (referred to as ENCORE (Enterprise Component Reusable framework)) is a component based framework that builds on top of industry standard OTS to provide robust distributed transaction management for mission critical business applications. It extends the programming model of OTS by providing a unique usage model that offers both flexibility and ease of use. This model separates the transactional behavior of CORBA method from the IDL interface. The transactional behavior of the CORBA method is specified in a deployment descriptor file. Each method is associated with a transactional policy. The server reads the policies of the methods during deployment time and makes decisions of making the method transactional based on the policy. Changing the transactional policy of a method is as easy as modifying the deployment descriptor and re-deploying the server. No code change is necessary. For example, in the Account example used previously, the IDL does not need to be transaction aware and could use the following model:

interface Account
   {
      void update (in long 1Balance);
   };

Users can design their system without even considering transactions initially. By comparison, if using straight OTS, the IDL is one of the following two:

interface Account: CosTransactions::TransactionalObject
   {
      void update (in long 1Balance);
   };
or
   interface Account
   {
      void update(in long 1Balance, in CosTransactions:: Control control);
   };

The advantage of using ENCORE's programming model is that the transaction characteristics are completely separated from the IDL interface.

The first IDL interface can then be implemented in either Java or C++. When deploying the server, a deployment descriptor needs to be supplied. The following is the deployment descriptor file for the above example:

TxPolicy=Account:{update=TxRequired}

Another advantage of ENCORE is that its programming model is not restricted by any programming language or environment. This model is maintained consistently in C++ and Java language implementations of ENCORE. Not only can a client written in Java or C++ talk to servers written in C++ or Java in a transactional manner, EJB session beans running ENCORE client side library can act as a client to a C++ server with ENCORE server side library outside the EJB environment.

Figure 1:
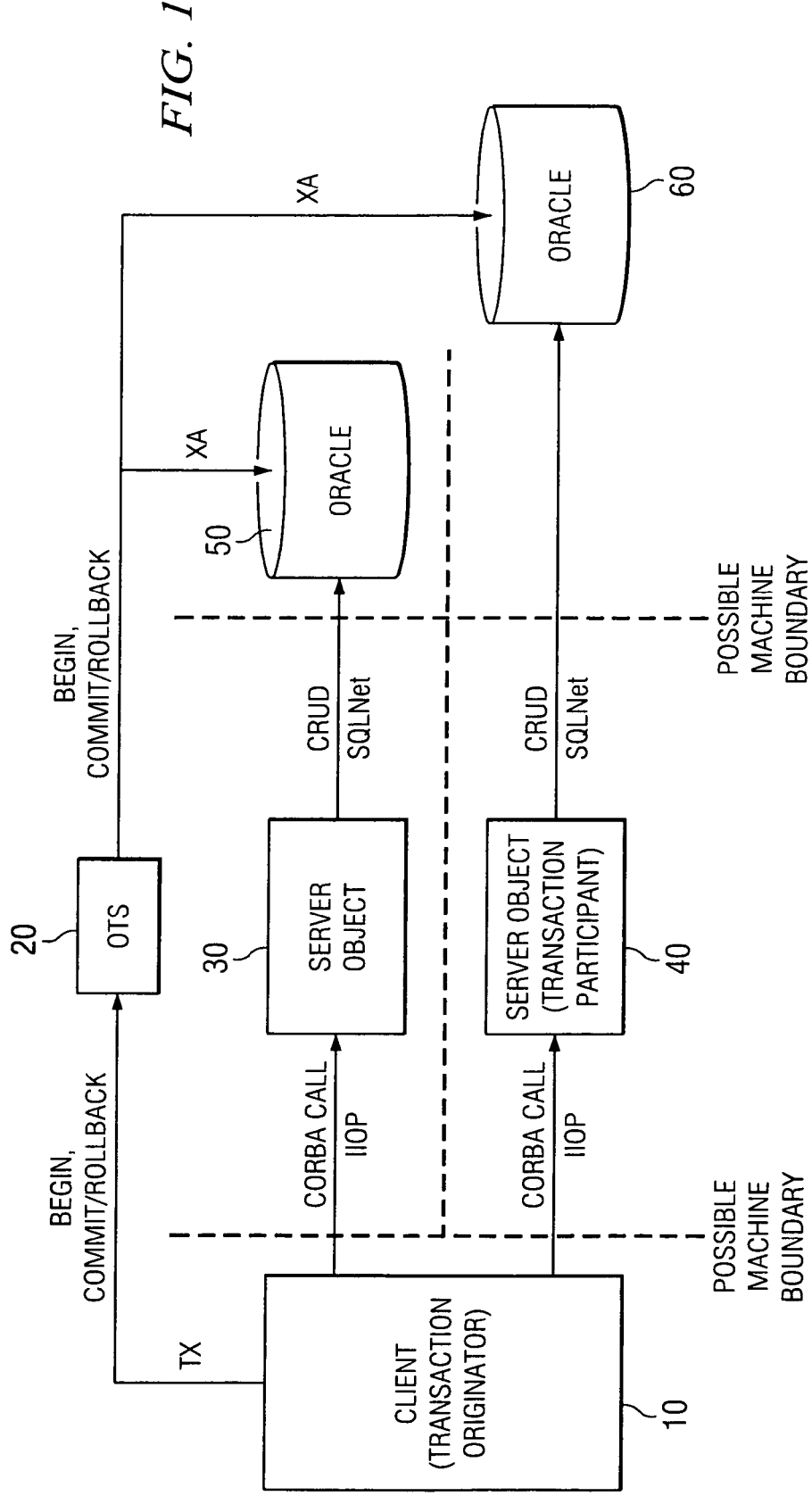
FIG. 1 is a diagram of potential participants in a CORBA-compliant distributed transaction.

FIG. 1 provides a diagram of the principal components of a distributed transaction accomplished in a CORBA-compliant manner. In the context of this disclosure, CORBA-compliant means compliant and compatible with the relevant specifications for CORBA in general and for CORBA OTS specifically. While the most preferred embodiment is compliant with CORBA 2.1 and OTS97, an embodiment compliant with CORBA 2.1 and CORBA OTS97 is defined as being CORBA-compliant with later embodiments of CORBA and CORBA OTS.

In FIG. 1, the client object 10 (also referred to as client application or more simply as client) acts as the transaction originator. To originate the transaction, client 10 sends a command to the Object Transaction Service 20 (also, referred to as OTS) to begin the transaction. At the same time, client 10 sends a CORBA call in the form of an IIOP message to both server object 30 and server object 40 (also referred to as server applications or more simply as servers). Server objects 30 & 40 are both transaction participants. The illustration provides two transaction participants to demonstrate the advantage of using a transaction service, where a request may require changes in multiple databases and where if one database is not able to make a change, any other changes may be rolled back to their original state. The server objects 30 & 40 each communicate with supporting databases 50 & 60 respectively, most preferably Oracle databases, but also potentially other relational databases. Each server object communicates CRUD commands (create, read, update, & delete) using SQL language. At the same time, the OTS 20 communicates with each database 50 & 60 to begin a transaction using XA commands compliant with the X/Open standard for two-phase commit protocols. There are potentially, but not necessarily, machine boundaries between any or all of the objects 10, 30, 40, 50, & 60 and OTS 20. After all of the CORBA calls return successfully, client 10 informs OTS 20 to commit the transaction and OTS 20 similarly informs the databases 50 & 60 to commit the transaction. At this point the transaction is complete and OTS 20 steps out of the picture. However, if one of the calls to server objects fail, for example because the database was unavailable, client 10 informs OTS 20 to rollback the transaction and OTS 20 informs any of databases 50 & 60 which have made a change to implement the transaction to rollback the change and return to their original state before the transaction began.

Figure 2:
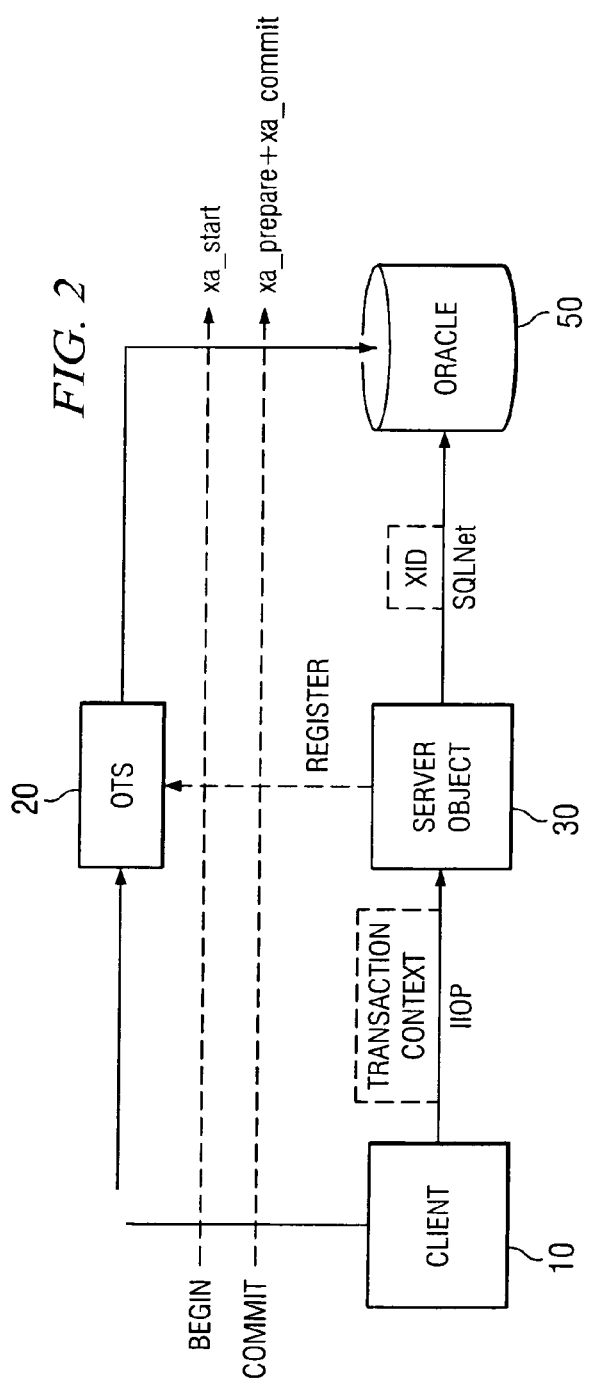
FIG. 2 is a diagram of potential participants in a CORBA-compliant distributed transaction using methods of the present invention for passing the transaction context.

In FIG. 2, a more detailed diagram illustrating the connections between client, server, database and OTS is provided. Client 10 provides commands to begin, commit, or rollback to OTS 20. Server Object 30 registers with OTS 20. Client 10 sends its CORBA call by IIOP message including the transaction context to server object 30. OTS 20 sends a start command and later a prepare and commit command or a rollback command to database 50 preferably using the X/Open standard. Server object 30 sends an SQL command to database 50 including a transaction id (or XID). Database 50 will respond to the server object 30's SQL request which is returned to client 10 which informs OTS 20 to commit or rollback the request depending on the response. OTS 20 informs database 50 to commit or rollback and the transaction is completed.

In the present invention, this model is accomplished by the use of CORBA interceptors. Whenever the client invokes a CORBA method on the server side, the client side interceptor intercepts the call and puts the "control" object (defined by OTS to represent the transaction context) encapsulated within a "session" object on the service context of the IIOP message. When the server receives the invocation, the interceptor first intercepts it, extracts the "session" object from the service context of the IIOP message, checks the policy, and make the appropriate calls to the OTS. Note that the session object encapsulates the control object and is sometimes referred to in this disclosure as the control object where the control object is the focus of the discussion.

Since this programming model is accomplished by using interceptors to propagate the transaction context information without the user's intervention, therefore, the propagation is implicit. Because the transaction context is completely managed by ENCORE's server side library, from the user's perspective the context management is indirect. While implicit and indirect context management are recognized and defined by the OTS specification, the indirect propagation of transaction context through the use of interceptors placing transaction context in a session object on the service context of the IIOP message is not known to the inventors outside of their present invention.

Figure 3:
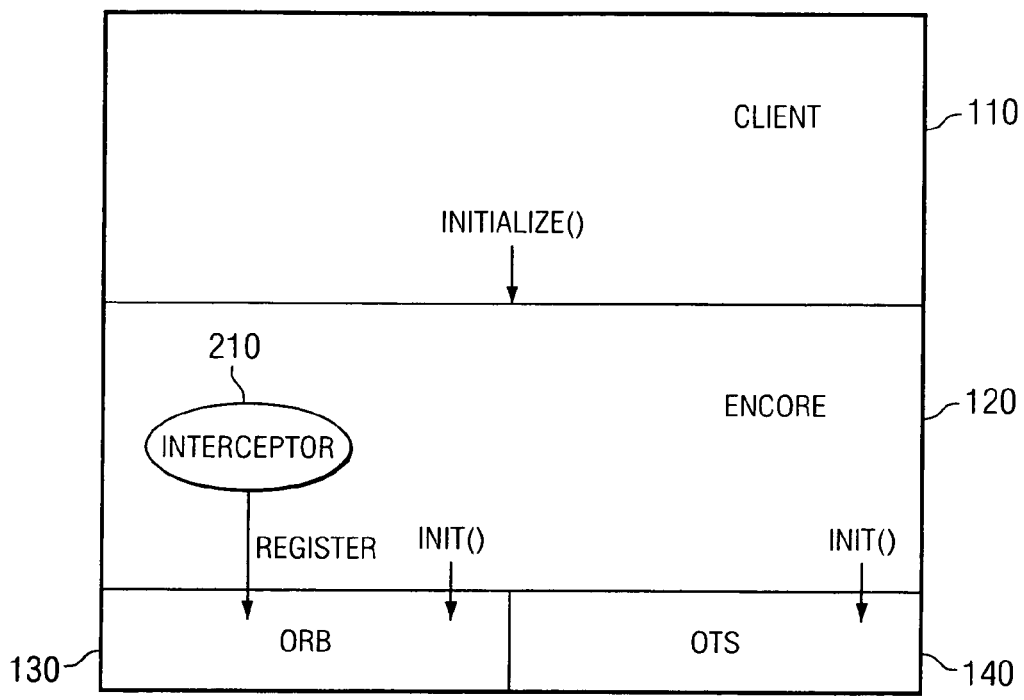
FIG. 3 is a diagram of the preferred actions of the present invention on the client side in response to an "initialize" call.

FIG. 3 diagrams a preferred embodiment of the events on client side when "initialize" is called. Client 110 calls initialize which is passed to its ENCORE framework 120. ENCORE framework 120 propogates the initialize to both ORB 130 and OTS 140. Interceptor 210 also registers with ORB 130 at initialization.

Figure 4:
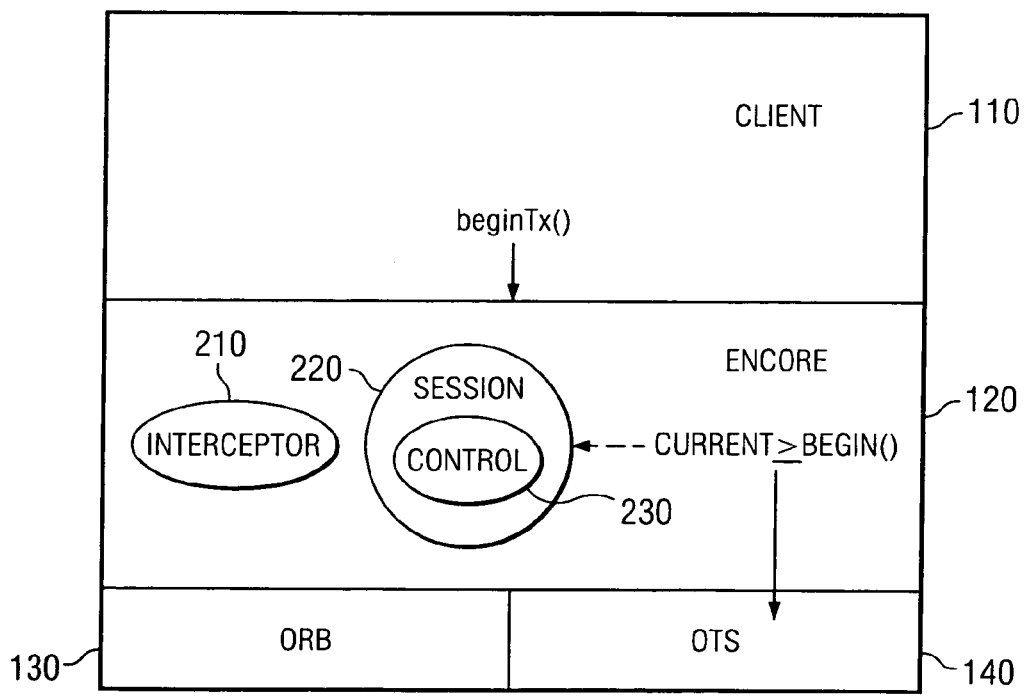
FIG. 4 is a diagram of the preferred actions of the present invention on the client side in response to a "beginTx" call.

FIG. 4 diagrams a preferred embodiment of the events on client side when "beginTx" is called. Client 110 calls beginTx to ENCORE framework 120 which constructs a session object 220 incorporating a control object 230. Encore framework 120 also initiates a begin command with OTS 140.

Figure 5:
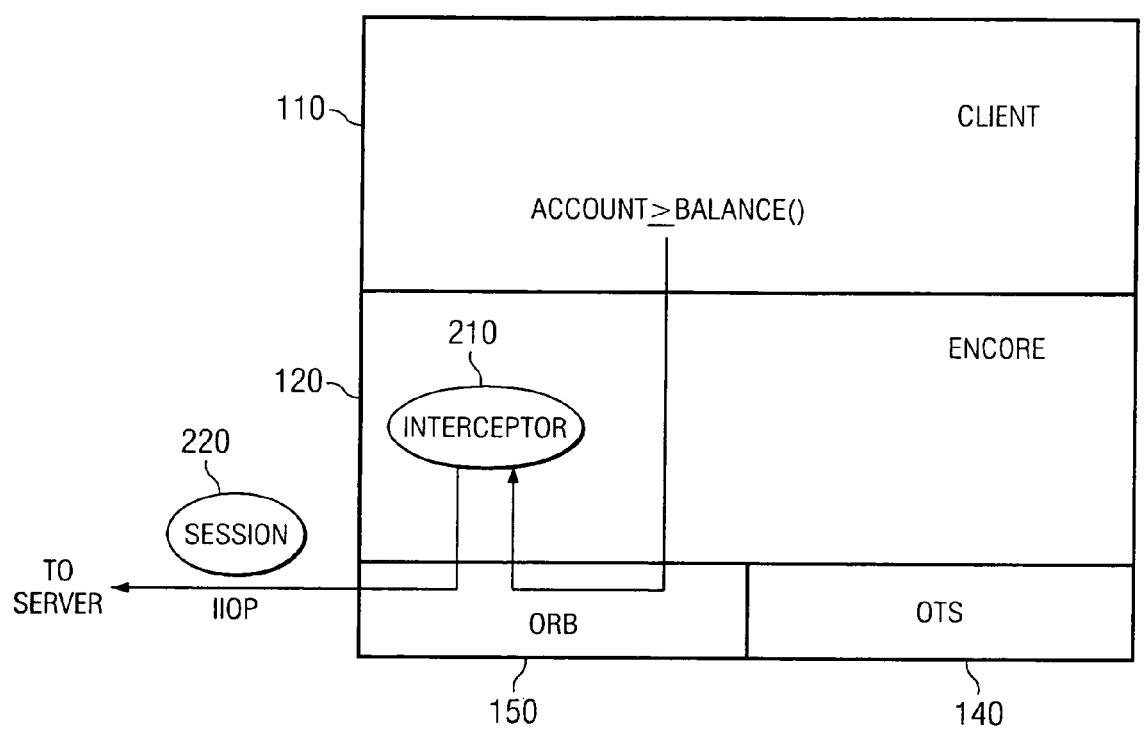
FIG. 5 is a diagram of the preferred actions of the present invention on the client side in response to a CORBA call of a defined CORBA object.

FIG. 5 diagrams the events which occur when a client call is made from the client side. When the client object 110 invokes a CORBA method on the server side (in this instance Account->Balance), the invocation is passed through ENCORE framework 120 to ORB 150. After the call is initially delivered to ORB 150, the client side interceptor 210 intercepts the call and puts the session object 220 (the object representing the transaction context and incorporating the control object) on the service context of the IIOP message heading to the server and then returns the IIOP message to ORB 150 for delivery.

Figure 6:
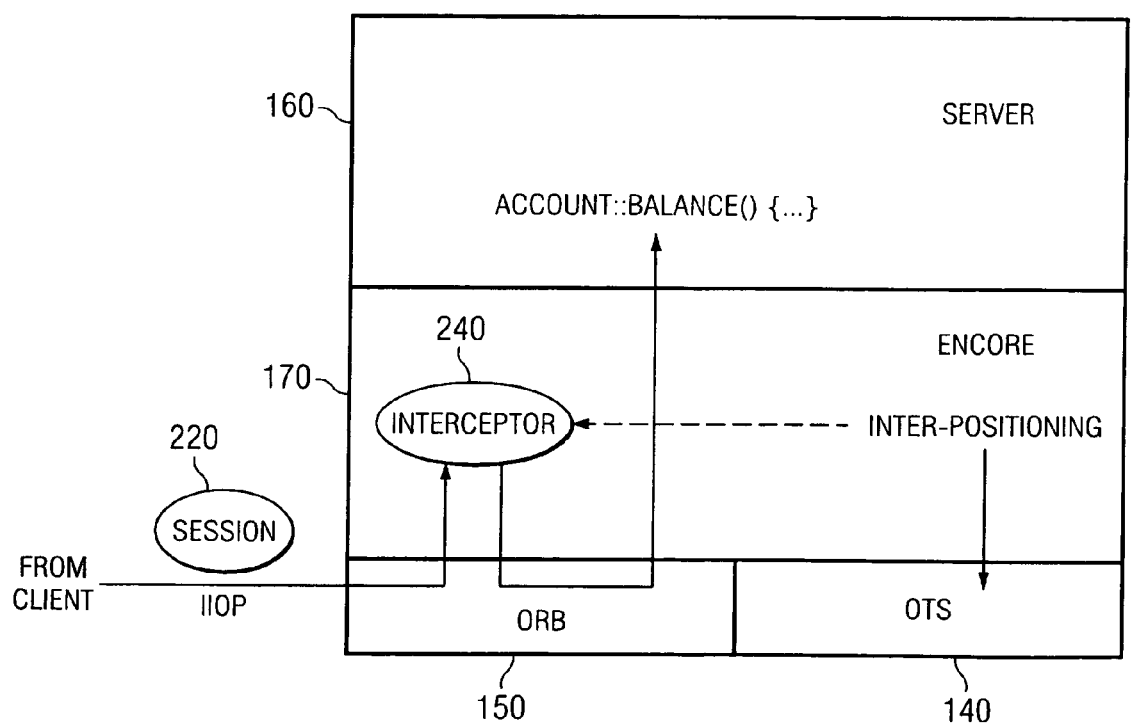
FIG. 6 is a diagram of the preferred actions of the present invention on the server side in response to a CORBA call of a defined CORBA object.

FIG. 6 diagrams the server side events. When the server side receives the invocation through the ORB 150, the server side interceptor 240 first intercepts the invocation, extracts the session object 220 and checks the transaction policy for the server. The transaction policy is read from the deployment descriptor when the server 160 is deployed. If the policy is not transactional, the interceptor 240 bypasses the OTS calls and invokes the user's implementation directly on the server object 160. But if the policy requires transaction, the interceptor code completes the control object interpositioning process, an OTS defined process between the session object 220 and the OTS 140 and then invokes the called method on the server object 160. Both the client object 110 and the server object 160 work in cooperation with separate ENCORE Frameworks 120 and 170 respectively to accomplish the defined process.

While the discussion here refers to client side and server side, one skilled in the art will recognize that a given system may function as both a client and a server at various times. When the specification refers to the client side, it is referring to the system or environment on which the client object is resident. Where the specification refers to a system remote from the client object it does not require a separate network or even a separate computer (as objects functioning in a client/server relationship may share a computer) but instead refers to a separate environment where communications between the client side and the server side (i.e., the local and remote system) are exchanged through the CORBA ORB rather than though another local channel.

The client object is the object making the request which may or may not require transactional support. The CORBA method being called or invoked is contained within an object. For shorthand, the term CORBA method is defined to include the object which contains the CORBA method. Hence where the statement is made that the CORBA method resides on a system, it is understood that the object containing the CORBA method resides on the system. In the above described example, the server object contains the invoked CORBA method.

The User's View

ENCORE's Programming interface provides the following interfaces to the client side and the server side:

| Client side interface: | Server side interface: |
|---|---|
| ENCORE::Container::Initialize( ); | ENCORE::Container::Initialize( ); |
| ENCORE::Container::beginTx( ); | ENCORE::Container::getUserName( ); |
| ENCORE::Container::endTx( ); | ENCORE::Container::getPassword( ); |
| ENCORE::Container::logon( ); | ENCORE::Container::isInTransaction( ); |
| ENCORE::Container::getBOAObject( ); | ENCORE::Container::getTxPolicy( ); |
| ENCORE::Container::getORBObject( ); | |

This interface is very simple, the transaction propagation and management is completely hidden to the user.

The deployment descriptor file preferably specifies the policies of all the methods resident on the server, but could specify transaction policies for a set of methods or even for an individual method. It is preferably read when the server process first starts up. The file format is preferably basically name and value pairs separated by "=" sign, but other separators or approaches to provide the information could also be used. The file format typically takes the form of a text file, but other formats understood by those of skill in the art could also be employed. At its heart, the deployment descriptor file is a stored file which lists transaction policies for specific methods.

When the deployment descriptor file is "read", the act of creation of the transaction policy actually transforms the data in the text file into a different form, typically but not necessarily tabular, which is preferably stored in a cache on the server. The act of checking the provided method name against the transaction policy comprises comparing the name to the names in the transaction policy and determining the specific policy associated with the name. In its most preferred form, this involves comparing the name against the transaction policy in the cache. However, in an alternative form, checking may involve reading the deployment descriptor file after receiving the method invocation to compare the invoked method name with the contents of the deployment descriptor file more contemporaneously (run-time instead of deployment time). Even this act involves pulling the stored information from the deployment descriptor file into memory (either as a whole or in pieces) and comparing, and such an act is included within the definition of creating a transaction policy. It is just an alternative, more ephemeral, transaction policy created in response to each request, rather than only at the time of deployment.

The user must supply the deployment descriptor file in order to deploy the server. While the deployment descriptor file is preferably stored on the system where the server object is resident, (i.e. on the server side), it may alternatively be stored elsewhere so long as the server has access to the file either during deployment or during run-time or both. By having the deployment descriptor file remote from the server, the same deployment descriptor file could be used to define the transaction policies for more than one server. In this manner, a group of servers typically deployed together and similarly situated may have their transaction policies modified by changing a single deployment descriptor file rather than having to change a deployment descriptor file for each server separately.

The Session Object (Incorporating and Sometimes Referred to as the CONTROL OBJECT)

In the preferred embodiment, the client side ENCORE container creates a session when a transaction is initiated on the client side. The session is identified by a unique id. The resulting session object comprises a string composed of the machine's IP address, the process id, the thread id, and the current time in mili-second. A session represents a transaction. All the information pertaining to a session is propagated to the server side on every method invocation, so that the server knows which transaction that particular call belongs to The session has a time-out parameter, which specifies how long it is allowed to exist before it gets cleaned up by the garbage collection mechanism of the ENCORE container. The session id gets logged in the server side log file on every call.

Computer Systems

Figure 7:
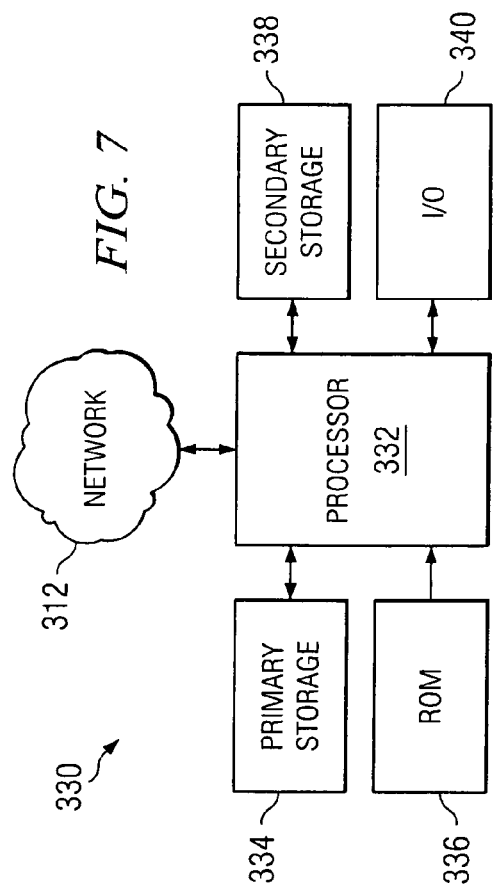
FIG. 7 is a diagram of a typical, general-purpose computer system suitable for implementing the present invention.

The method as described above may generally be implemented on a variety of different computer systems. FIG. 7 illustrates a typical, general-purpose computer system suitable for implementing the present invention. The computer system 330 includes a processor 332 (also referred to as a central processing units, or CPU) that is coupled to memory devices including primary storage devices 336 (typically a read only memory, or ROM) and primary storage devices 334 (typically a random access memory, or RAM).

As is well known in the art, ROM acts to transfer data and instructions uni-directionally to CPU 332, while RAM is used typically to transfer data and instructions in a bi-directional manner. Both storage devices 334 & 336 may include any suitable computer-readable media. A secondary storage medium 338, which is typically a mass memory device, is also coupled bi-directionally to CPU 332 and provides additional data storage capacity. The mass memory device 338 is a computer-readable medium that may be used to store programs including computer code, data, and the like. Typically, mass memory device 338 is a storage medium such as a non-volatile memory such as a hard disk or a tape which are generally slower than primary storage devices 334, 336. Mass memory storage device 338 may take the form of a magnetic or paper tape reader or some other well-known device. It will be appreciated that the information retained within the mass memory device 338, may, in appropriate cases, be incorporated in standard fashion as part of RAM 334 as virtual memory. A specific primary storage device 334 such as a CD-ROM may also pass data uni-directionally to the CPU 332.

CPU 332 are also coupled to one or more input/output devices 340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 332 optionally may be coupled to a computer or telecommunications network, e.g., an internet network, or an intranet network, using a network connection as shown generally at 312. With such a network connection, it is contemplated that CPU 332 might receive information from the network, or might output information to the network in the course of performing the above-described method steps. Such information, which is often represented as a sequence of instructions to be executed using CPU 332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network.

Although only a few embodiments of the present invention have been described, it should be understood that the present invention may be embodied in many other specific forms without departing from the spirit or the scope of the present invention. By way of example, while databases which communicate using SQL and X/Open commands are described, databases which communicate and support transactions using alternative defined protocols could equally be used without departing from the spirit of the present invention.

Therefore, the present examples are to be considered as illustrative and not restrictive, and the invention is not to be limited to the details given herein, but may be modified within the scope of the appended claims along with their full scope of equivalents.

What is claimed is:

1. A method for setting transactional behavior for a CORBA method, the method comprising:
   a system remote from a client creating a transaction policy by translating a deployment descriptor file;
   the client calling a CORBA method, wherein the client resides on a system, wherein the CORBA method resides on the system remote from the client, and wherein the call comprises an IIOP message wherein the IIOP message includes a method name for the CORBA method called;
   an interceptor residing on the system remote from the client intercepting the IIOP message;
   the interceptor residing on the system remote from the client reading the method name from the IIOP message;
   the interceptor residing on the system remote from the client checking the transaction policy for the system remote from the client with respect to the method name;
   the interceptor residing on the system remote from the client either invoking the called CORBA method directly or first completing a control object interpositioning process and then invoking the called CORBA method where the choice is defined by the results of the check of the transaction policy with respect to the method name.

2. The method of claim 1, wherein the transaction policy created on the system remote from the client is created during deployment of the system remote from the client.

3. The method of claim 1, wherein the transaction policy created on the system remote from the client is created after receipt of the IIOP message to facilitate run-time comparison of the method name with the deployment descriptor file.

4. A method for setting transactional behavior for a CORBA method, the method comprising:
   a system remote from a client creating a transaction policy by translating a deployment descriptor file during deployment of the system;
   the client calling a CORBA method, wherein the client resides on a system, wherein the CORBA method resides on the system remote from the client, wherein the call comprises an IIOP message having a service context, and wherein the IIOP message includes a method name for the CORBA method called;
   an interceptor intercepting the IIOP message, wherein the interceptor resides on the system local to the client;
   the interceptor residing on the system local to the client inserting an object representing the transaction context on the service context of the IIOP message;
   the interceptor residing on the system local to the client returning the IIOP message to its original path;
   an interceptor residing on the system remote from the client intercepting the IIOP message;
   the interceptor residing on the system remote from the client extracting the object representing the transaction context from the service context of the IIOP message and reading the method name from the IIOP message;
   the interceptor residing on the system remote from the client checking the transaction policy for the system remote from the client with respect to the method name;
   the interceptor residing on the system remote from the client either invoking the called CORBA method directly or first completing a control object interpositioning process between the object representing the transaction context and an OTS spanning both the system local to the client and the system remote from the client and then invoking the called CORBA method where the choice is defined by the results of the check of the transaction policy with respect to the method name.

5. A method for changing transactional behavior for a CORBA method resident on a server; the method comprising:
   defining transactional behavior for a CORBA method resident on a server in a transaction policy implemented on the server, wherein the transaction policy is translated from a deployment descriptor file during deployment of the server, and wherein invocations of the CORBA method from client objects result in a defined transactional behavior based on the transaction policy;
   modifying the deployment descriptor file to change the transactional behavior for the CORBA method on the server;
   redeploying the server which implements a modified transaction policy translated from the modified deployment descriptor file wherein identical invocations from identical client objects result in a different defined transactional behavior for the CORBA method on the server based on the modified transaction policy.

6. The method of claim 5, wherein the deployment descriptor file and the transaction policy translated from the deployment descriptor file define transactional behavior for more than one CORBA method resident on the server.

7. The method of claim 6, wherein the deployment descriptor file and the transaction policy translated from the deployment descriptor file define transactional behavior for all CORBA methods resident on the server.

8. The method of claim 6 wherein the deployment descriptor file is a text file and wherein the transaction policy is a table translated from the text file.

9. The method of claim 6, wherein the deployment descriptor file is stored on the server.

10. The method of claim 6 wherein the deployment descriptor file is stored in a location remote from the server.

11. The method of claim 10 wherein the deployment descriptor file is translated by a plurality of servers to create the transaction policies for the plurality of servers.

* * * * *